CENTERING CIRCUIT FOR CATHODE-RAY TUBES

Filed Nov. 29, 1949

INVENTOR
Gordon F. Rogers
BY
Olin J. Mitchell
ATTORNEY

Patented May 5, 1953 2,637,832

UNITED STATES PATENT OFFICE 2,637,832

CENTERING CIRCUIT FOR CATHODE-RAY TUBES

Gordon F. Rogers, New Hyde Park, N. Y., assignor to Radio Corporation of America, a corporation of Delaware Application November 29, 1949, Serial No. 129,897

12 Claims. (Cl. 315—27)

Figures 1, 2:
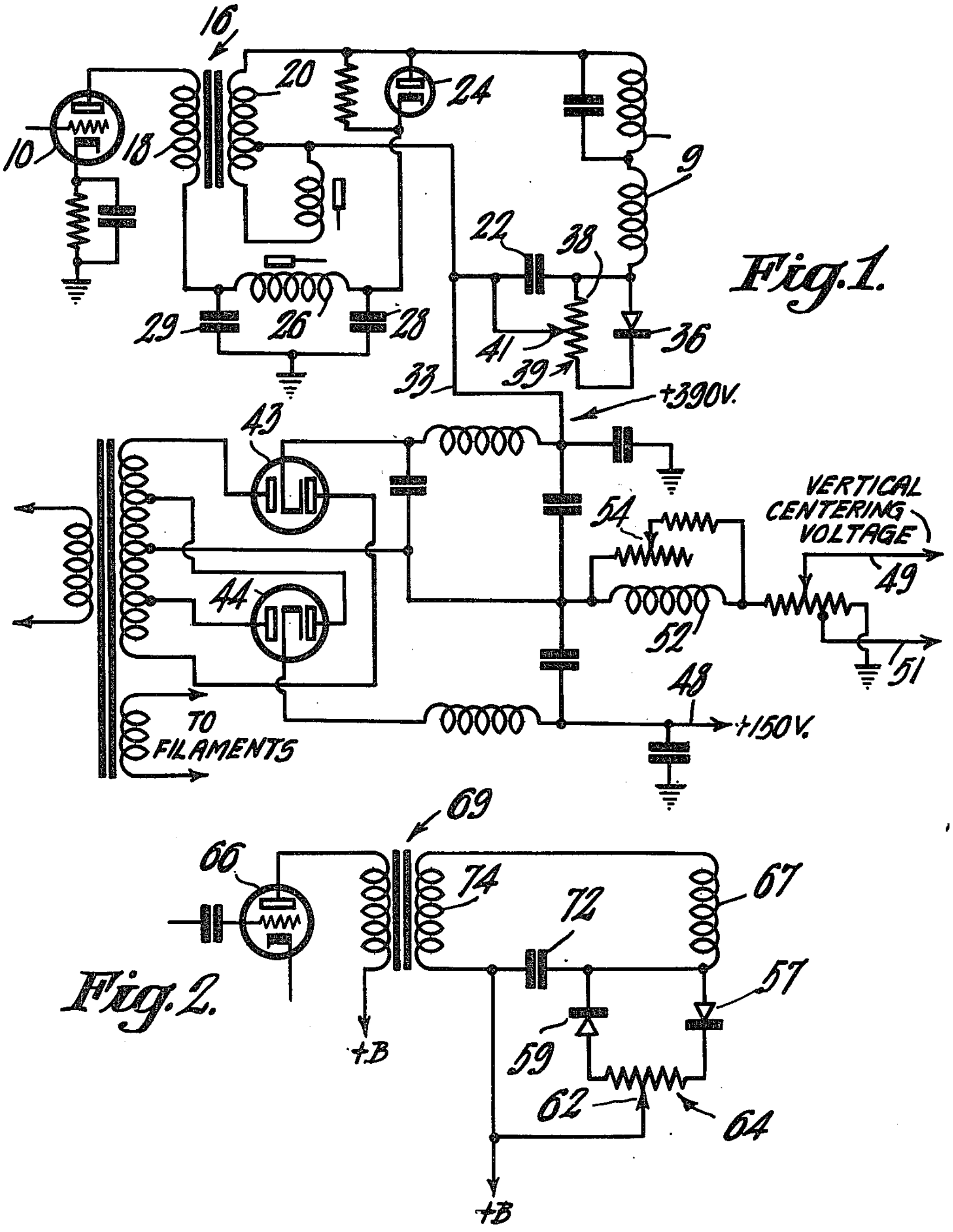

The present invention relates to centering circuits for cathode ray tube deflecting devices and, more particularly, but not exclusively, to means for centering the beam in a cathode ray tube which is independent of power supply sources or other sources of current used for centering.

In accordance with the invention, the voltage across a condenser in series with the deflection coils is rectified to provide centering in one direction. The anode current flow to the tube which furnishes deflection current provides centering in the opposite direction. Presently known circuits used for electrical centering require that the receiver current drain on the power supply, other than the horizontal output tube, be taken from the same supply as the horizontal output tube, and that this current be approximately equal to the current of the horizontal output tube as a minimum value. With the centering means of the present invention, the B+ supply for the remainder of the receiver may be independent of and of lower voltage output thus giving a saving in power consumption from the supply mains and requiring less heat to be dissipated.

The primary object of the present invention is to provide improved centering means for cathode ray tube deflecting devices.

A further object is to provide an improved centering circuit for the highly inductive deflecting circuit of a cathode ray tube.

Other objects and advantages of the present invention will, of course, become apparent and immediately suggest themselves to those skilled in the art to which the invention is directed from a reading of the following specification in connection with the accompanying drawing in which:

Fig. 1 shows diagrammatically a portion of a television receiver or similar cathode ray tube apparatus embodying the present invention; and Fig. 2 is a diagrammatic showing of another embodiment of the invention.

Referring to the drawing, there is shown a deflection circuit for driving deflection current of sawtooth wave form through deflection coils 9. The invention is applicable to high frequency deflection and therefore the horizontal deflecting system for the beam of a cathode ray tube (not shown) has been selected as an illustrative setting of the invention. The system includes a power tube 10 which is adapted to supply cyclically varying current to the horizontal, or line, cathode ray beam deflection coil or coils 9 through a coupling transformer 16. It will be understood, as is by now well known in the art, that voltage variations of suitable wave form are to be applied to the grid of the tube 10. The transformer 16 is provided with a primary winding 18 and a secondary winding 20. This secondary winding is connected across the coils 9 in series with a condenser 22 having a relatively large capacity. The horizontal deflecting coils 9, together with a pair of vertical or field deflection coils (not shown) preferably form part of a yoke assembly encircling the neck of a cathode ray image producing tube (not shown). Such an arrangement is by now well known to those skilled in the art. Diode damper tube 24 serves to damp out oscillations which would be produced in the deflecting circuit by reason of the inductance and distributed capacity of the coils 9 forming a tuned circuit which is resonant at a relatively high frequency and therefore provides for rapid retrace. The variable inductance 26 is connected between two condensers 28 and 29. The condenser 28 serves in effect to store a voltage during operation of the system which boosts the voltage of the power source having a terminal 33 which provides direct current energy for operating the system. The inductance 26 delays the voltage which appears on the condenser 29 for a purpose fully set forth in U. S. Patent No. 2,440,418, granted to S. I. Tourshou, April 27, 1948. The arrangement just described is not necessarily a part of the present invention and, therefore, need not be expained further.

To provide for centering in accordance with the invention, a rectifier 36 is connected in parallel with the resistor 38 of a potentiometer 39. The rectifier 36 may be a single plate selenium rectifier. Such rectifiers having a 100 ma. rating are readily obtainable. The anode terminal of the rectifier, as well as one terminal of the resistor 38 are connected to the end of one of the horizontal deflection coils 9. The adjustable arm 41 of the potentiometer 39 is connected in the deflection circuit so that the condenser 22 is included in circuit between one terminal of the resistor 38 and the adjustable potentiometer arm 41.

The power supply source previously referred to is indicated somewhat in detail to illustrate the type of power supply which may be employed when cathode ray beam centering is obtained in accordance with the present invention for the horizontal deflecting system. In this arrangement two separate rectifiers 43 and 44 are used. The rectifier 43 furnishes B+ supply for the anode of the power tube 10. The rectifier 44 furnishes output for other circuits (not shown)

included in the television receiver. This output is taken from the terminal 48. The power supply may comprise suitable filtering arrangements such as are well known and are shown by way of example in the drawing. Centering for the vertical deflection system (not shown) in the illustrative example is obtained by connecting the vertical deflecting coils and the secondary of the vertical deflecting transformer (neither shown) in series to the terminals 49 and 51. This centering is obtained by the return currents from the television receiver components including the power tube 10 which also traverses a focussing coil 52. Focussing current for the cathode ray beam is adjusted by a rheostat 54.

In operation of the centering arrangement of this invention, when the adjustable contact 41 of the potentiometer is positioned so that it is at the end of the resistor 38 nearest the deflection coil 9, which as viewed in Fig. 1 is the top of the potentiometer, the condenser 22 is shorted out and the raster appearing on the face of the image or picture tube (not shown) is moved to one side of center because of a direct current component then flowing from the terminal 33 through the potentiometer contact 41, the deflection coils 9, the damper tube 24 to the anode of the power tube 10. When the arm of the potentiometer is at the opposite end of the resistor 38, which is the bottom of the resistor as shown in the drawing, this D. C. path is essentially removed and the relatively small alternating current voltage across the condenser 22 is rectified and a current is thus made to flow through the deflection coils in the opposite direction and the raster is moved to the other side of center. Intermediate positions of the arm 41 of the potentiometer 38 provide intermediate positions of the raster on the cathode ray tube (not shown).

Fig. 2 of the drawing discloses an arrangement in accordance with the invention whereby the raster produced by the deflected beam may be moved to either side of the face of the image or picture tube (not shown) upon development of a rectified current by one or the other of two rectifiers 57 or 59. The rectified current can be made to flow in either direction depending upon the position of the sliding contact 62 of a potentiometer 64 of relatively high resistance as compared to the condenser reactance.

A power tube 66 corresponds in function to the tube 10 of Fig. 1 and provides deflecting current to a horizontal deflection coil or coils 67 through a coupling transformer 69. Damping means may be employed as pointed out above in connection with Fig. 1. A relatively large condenser 72 is included in series between the transformer secondary 74 and the deflection coils 67.

In operation of the centering arrangement disclosed by Fig. 2, when the adjustable contact 62 is positioned so that it is nearest the cathode of the rectifier 57 the alternating current voltage across the condenser 72 is rectified and rectified current flows through the deflection coils 67 in one direction. By convention, this current may be assumed as flowing through the coils 67 from top to bottom as shown in the drawing. When the contact 62 is positioned nearest the anode of the rectifier 59, rectified current flows through the coils 67 in the opposite direction. The position of the contact 62 between its extreme position provides intermediate positions of the raster on the cathode ray tube (not shown).

What is claimed is:

1. In combination, a cathode ray tube deflecting coil, a condenser, a source of periodic deflecting current, means including said condenser for coupling said source to said coil, a rectifier, a resistor connected in shunt with said rectifier, a connection from one terminal of said rectifier to one end of said coil, and a connection effectively from the other end of said coil to a point on said resistor.

2. In combination, a cathode ray tube deflecting coil, a condenser, a source of periodic deflecting current, means including said condenser for coupling said source to said coil, a rectifier, a potentiometer resistor connected in parallel with said rectifier, a connection from the anode terminal of said rectifier to one end of said coil, and a connection effectively from the other end of said coil to a variable tap on said potentiometer resistor.

3. In combination, a cathode ray tube deflecting coil, a source of periodic deflecting current, a transformer having a primary and a secondary, said source being coupled to said coil through said transformer, a condenser interposed between said transformer and said coil, a rectifier, a resistor connected in shunt with said rectifier, a connection from one terminal of said rectifier to one end of said coil, and a connection from said transformer to a point on said resistor.

4. In combination, a cathode ray tube deflecting coil, a condenser, a source of periodic deflecting current, means including said condenser for connecting said source to said coil, a rectifier, and connections from said rectifier to said condenser, said connections placing said condenser in shunt to said rectifier to produce a rectified current in said coil.

5. In combination, a cathode ray tube deflecting coil, a condenser, a source of periodic deflecting current, means including said condenser for connecting said source to said coil, a rectifier, and connections including a potentiometer from said rectifier to said condenser, said connections placing said condenser in shunt to said rectifier to produce a rectified current in said coil, the magnitude of said current being varied by adjustment of said potentiometer.

6. In combination, a cathode ray tube deflecting coil, a condenser, a source of periodic deflecting current, means including said condenser for coupling said source to said coil, a pair of rectifiers, a potentiometer resistor connected in series with said rectifiers, one of said rectifiers having its cathode connected to said resistor and the other rectifier having its anode connected to said resistor, a connection from the remaining terminals of said rectifiers to one end of said coil, and a connection effectively from the other end of said coil to a variable tap on said potentiometer resistor.

7. In combination, a cathode ray tube deflecting coil, a source of periodic deflecting current, a transformer having a primary and a secondary, said source being coupled to said coil through said transformer, a condenser interposed between said transformer and said coil, a pair of rectifiers, a potentiometer resistor connected in series with said rectifiers, a connection from one terminal of each of said rectifiers to one end of said coil, and a connection from said transformer to a variable tap on said potentiometer resistor.

8. In combination, a cathode ray tube deflecting coil, a condenser, a source of periodic deflecting current, means including said condenser for connecting said source to said coil, a pair of rectifiers, and means whereby said rectifiers bridge said condenser to produce a rectified current of changeable direction in said coil.

9. In combination, a cathode ray tube deflecting coil, an output tube having an output circuit for supplying deflecting current, a transformer having a primary and a secondary, said primary being coupled to said output circuit and said secondary being connected in series with said deflecting coil, a condenser included in said series connction, a rectifier having one terminal connected to said coil and to one terminal of said condenser, a potentiometer resistor having one end connected to said coil and its other end connected to the remaining terminal of said rectifier, and a variable tap on said resistor connected to the remaining terminal of said condenser.

10. In a ray deflecting system for a cathode ray tube, a deflecting coil, an output tube having an output circuit for supplying deflecting current, a transformer having a primary and a secondary, said primary being coupled to said output circuit and said secondary being in series with said deflecting coil, a condenser included in said series connection, a rectifier having one terminal connected to said coil and to one terminal of said condenser, a potentiometer resistor having one end connected to said coil and its other end connected to the remaining terminal of said rectifier, a variable tap on said resistor connected to the remaining terminal of said condenser, a deflection damping device, a path for anode current supply for said output tube including said variable tap, said coil and said deflection damping device, whereby to obtain beam centering in one direction, centering in the other direction being provided by a rectified current provided by said rectifier.

11. In combination, a cathode ray tube deflecting coil, a source of periodic deflecting current, means for coupling said source to said coil, a rectifier, a resistor connected in parallel with said rectifier, a connection from the anode terminal of said rectifier to one end of said coil, and a connection effectively from the other end of said coil through said coupling means to the cathode of said rectifier, said connection placing said coil in series with said rectifier and said coupling means.

12. In combination, a cathode ray tube deflecting coil, a source of periodic deflecting current, a rectifier, a resistor connected in parallel with said rectifier, a connection from the anode terminal of said rectifier to one end of said coil, and a connection effectively from the other end of said coil through said source to the cathode of said rectifier, said connection placing said coil in series with said rectifier and said source.

GORDON F. ROGERS.

References Cited in the file of this patent

UNITED STATES PATENTS

| Number | Name | Date |
|---|---|---|
| 2,149,077 | Vance | Feb. 28, 1939 |
| 2,223,990 | Holmes | Dec. 3, 1940 |
| 2,562,941 | Parker | Aug. 7, 1951 |
| 2,601,415 | Oliver | June 24, 1952 |